Nov. 20, 1956  C. N. WINNINGSTAD ET AL  2,771,582
PHASE METER
Filed Dec. 9, 1953  3 Sheets-Sheet 1

Fig. A.

INVENTORS.
CHESTER N. WINNINGSTED
QUENTIN A. KERNS
BY
ATTORNEY.

INVENTORS.
CHESTER N. WINNINGSTED
QUENTIN A. KERNS
BY
ATTORNEY.

United States Patent Office 2,771,582
Patented Nov. 20, 1956

2,771,582

PHASE METER

Chester N. Winningstad, San Lorenzo, and Quentin A. Kerns, Berkeley, Calif., assignors to the United States of America as represented by the United States Atomic Energy Commission Application December 9, 1953, Serial No. 397,288

2 Claims. (Cl. 324—85)

The present invention relates to a phase meter and more particularly to a device for indicating the phase difference between two points of a radio frequency system.

With the increasing use of radio frequency circuits it becomes more advantageous to be able to determine the phase shift which occurs across the various elements of the circuit. Where high frequencies are involved the problem of accurate determination of phase difference between two points is complicated by the fact that special equipment is generally required to suitably handle the currents and voltages of the circuit.

The present invention overcomes such difficulties by converting the radio frequencies to substantially low frequencies having the same phase relationship. To provide frequency stability an automatic frequency control circuit is employed and to render the resulting phase determination convenient an adjustable feedback circuit is utilized to establish the correct reference levels of the low frequencies.

It is therefore an object of the present invention to provide a new and improved phase meter.

Another object of the invention is to provide a radio frequency phase meter for use with either pulsed or continuous wave systems.

An additional object of the invention is to provide a radio frequency phase meter having two signal channels with means included in each channel for developing a substantially low frequency signal in phase with the input.

Still another object of the invention is to provide a radio frequency phase meter utilizing standard commercial elements well within their ratings.

A further object of the invention is to provide a radio frequency phase meter having two signal channels with means included in each channel for mixing the input signal with a second signal to provide two separate output signals having constant and equal low frequency.

Other objects and advantages of the invention will be apparent in the following description and claims considered together with the accompanying drawing, in which:

Figure 1:
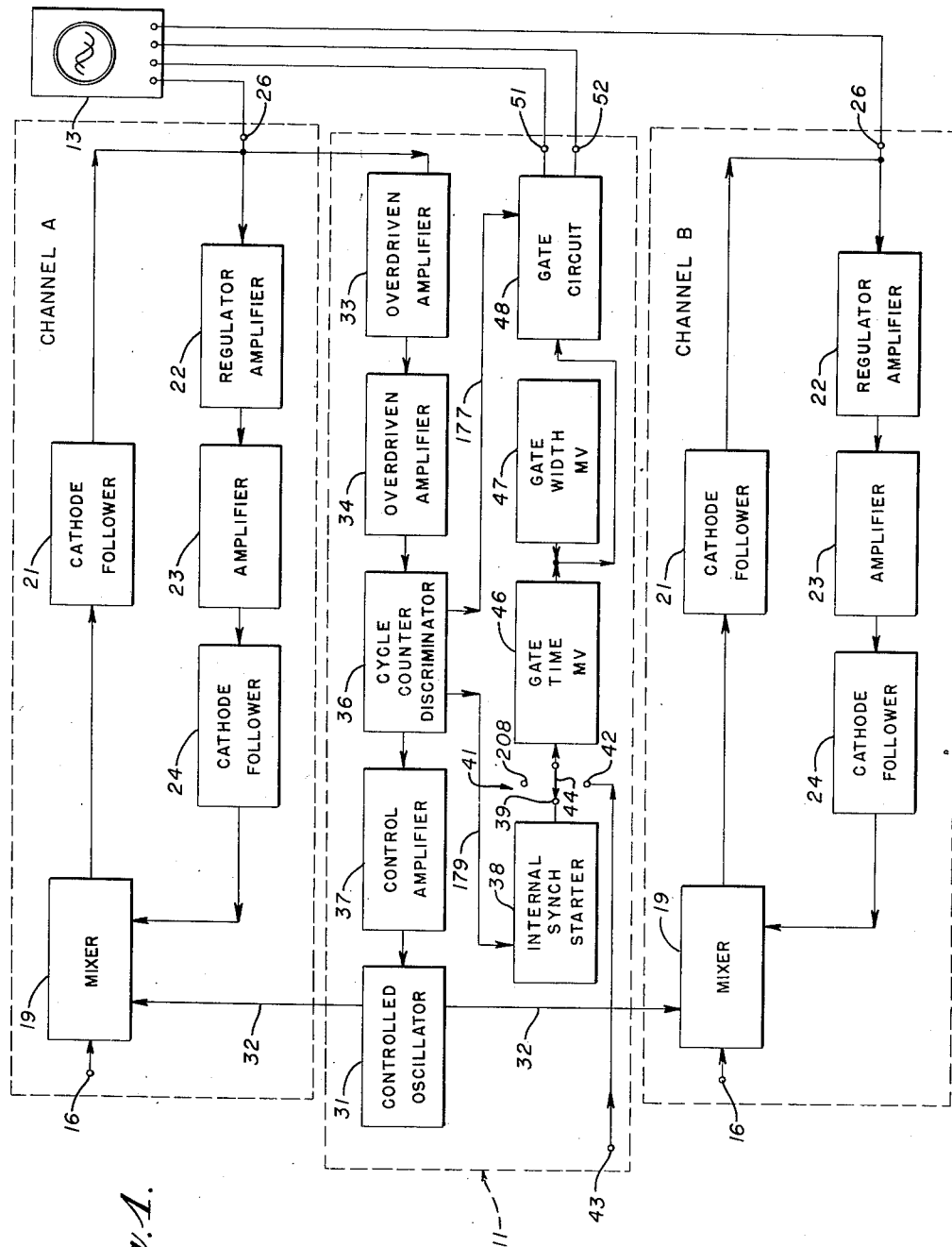
Figure 1 is a schematic block diagram of the present invention with the paths of signal voltages indicated by single lines.

Referring to the drawing in detail, Fig. 1 in particular, it is to be noted that the invention comprises, in general, a channel A, a similar channel B, a controlled oscillator circuit 11 having automatic frequency control, and a dual beam oscilloscope 13. Signal channels A and B are identical and only one will be described in detail hereinafter. An input terminal 16 is provided in the signal channel for convenience in connecting to a source of radio frequency, the phase of which is to be determined. The terminal 16 is connected to one input of a mixer 19, the output of which is connected to the input of a cathode follower 21. To establish the D. C. level at which the cathode follower 21 operates, there is provided a series loop comprising a regulator amplifier 22, amplifier 23, and cathode follower 24 connected between the output of the cathode follower 21 and a second input of the mixer 19. An output terminal 26 is connected to the junction between the cathode follower 21 and the regulator amplifier 22.

A controlled oscillator 31 in the controlled oscillator circuit 11 is provided with an output connection 32 which is connected to a third input of the mixer 19 in each of channels A and B. For automatic frequency control of the controlled oscillator 31 the output of the cathode follower 21 in channel A is connected to the input of a series-connected first overdriven amplifier 33, second overdriven amplifier 34, cycle counter discriminator 36, and control amplifier 37, the output of such latter amplifier being connected to a frequency control element of the oscillator. The output of the cycle counter discriminator 36 is also connected to the input of an internal synch starter 38 and the output of such element is connected to one position 39 of a three-position switch 41. A second position 42 of the switch 41 is connected to a terminal 43 adapted to be connected to a source of external synchronizing signals (not shown). The swinger 44 of the switch 41 is connected to the input of a series-connected gate time multivibrator 46, a gate width multivibrator 47, and a gate circuit 48. Also, a second output of the cycle counter discriminator 36 is connected to a second input of the gate circuit 48. An output of such gate circuit 48 provides a synchronizing signal and is connected to a terminal 51 while a second output provides a variable voltage during the time of the synchronizing signal and is connected to another terminal 52. The horizontal deflection plates of the dual beam oscilloscope 13 are, suitably and respectively, connected to the terminals 26 of channels A and B. Also the synchronization terminal and brightener control terminal of the oscilloscope 13 are respectively connected to the terminals 51 and 52 of the gate circuit 48.

The operation of the invention, in brief, is based upon separately mixing the input signal of each of channels A and B with the output of the controlled oscillator 31 to obtain two separate, substantially low frequency, outputs for ready phase comparison upon the screen of the oscilloscope 13. So that the output signals at the terminals 26 have substantially the same D. C. level, each of the channels A and B are provided with an adjustable loop circuit connected between the output terminals 26 and a control element of the mixer 19. Also, to provide a difference frequency which is substantially constant in spite of reasonable input frequency variations, an automatic frequency control circuit (as set forth in the foregoing) is connected between the output terminal 26 of channel A and the oscillator 31.

Figure 2:
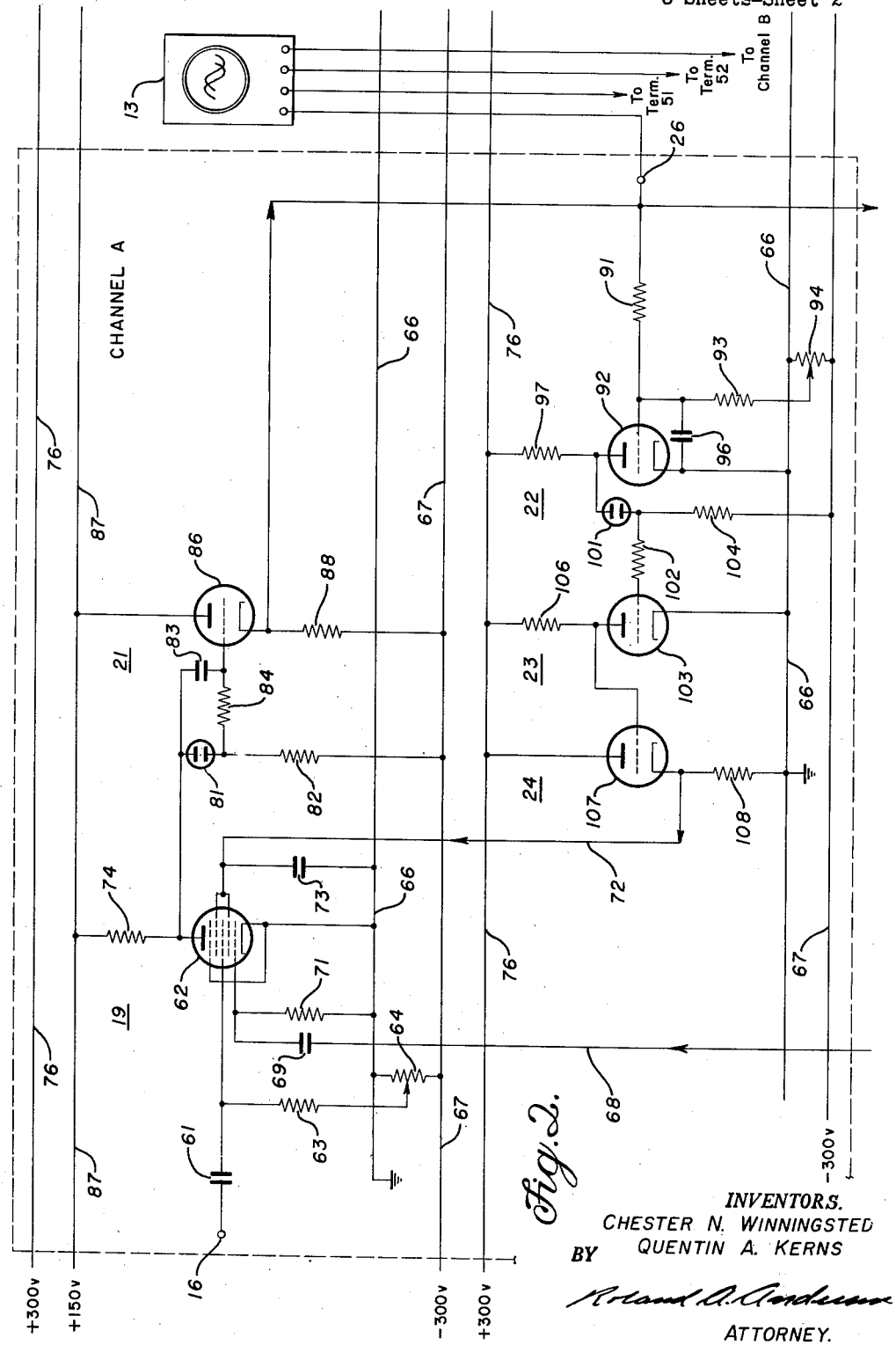
Figure 2 is a schematic wiring diagram of signal channel A of Fig. 1 and is also typical of signal channel B.

Referring now to channel A, in detail (see Fig. 2), the input terminal 16 is connected through a coupling capacitor 61 to the third grid of a pentagrid type tube 62 comprising the mixer 19. Bias is supplied to such third grid of the tube 62 by means of a resistor 63 connected from the grid to the adjustable element of a potentiometer 64 which, in turn, is connected between a grounded lead 66 and a lead 67 carrying a negative voltage of, for example, 300 volts. The cathode and the fifth grid of the tube 62 are connected directly together and the junction therebetween is directly connected to the grounded lead 66. A lead 68 from the oscillator circuit 11 is connected through a coupling capacitor 69 to the first grid of the tube 62 and a resistor 71 is connected between such first grid and the grounded lead 66. A common connection between the second and fourth grids of the tube 62 is connected to a lead 72 and through a by-pass capacitor 73 to the grounded lead 66. To complete the connections of the pentagrid tube 62 a dropping resistor 74 is connected between the anode of the tube and a lead 76 carrying a positive voltage of, for example, 300 volts.

The anode of the pentagrid tube 62 is connected to a series circuit comprising a glow tube 81 and a resistor 82, such resistor being connected to the negative lead 67. A capacitor 83 and a resistor 84 are connected in series across the glow tube 81 with the junction between such series elements connected to the control grid of a triode type tube 86 which serves as the cathode follower 21, previously referenced. The foregoing elements connected between the anode of the pentagrid tube 62 and the control grid of the triode tube 86 provide direct current coupling therebetween and the values are selected so that a low pass filter is formed with the stray capacitances of the circuit and the interelectrode capacitances of the tubes. To complete the connections of the triode tube 86 the anode is directly connected to a lead 87 carrying a positive voltage of, for example, 150 volts and the cathode is connected through a resistor 88 to the negative lead 67. The output terminal 26 is directly connected to the cathode of the triode tube 86.

A current limiting resistor 91 is connected from the terminal 26 to the control grid of a triode type tube 92 serving as the principal element of the regulator amplifier 22. To provide bias to the control grid of the tube 92 a resistor 93 is connected between such element and the adjustable arm of a potentiometer 94 which, in turn, is connected between the grounded lead 66 and the negative lead 67. A by-pass capacitor 96 is connected between the control grid of the tube 92 and the grounded lead 66. Further operating connections of the tube 92 comprise a direct connection from the cathode to the grounded lead 66 and a connection from the anode through a dropping resistor 97 to the positive lead 76.

Direct current coupling is provided by connecting one side of a glow tube 101 directly to the anode of the tube 92 and the other side through a current limiting resistor 102 to the control grid of another triode type tube 103 which serves as the amplifier 23. Suitable bias for the operation of the tube 103 is supplied by connecting a resistor 104 between the junction of the glow tube 101 and resistor 102 and the negative lead 67. To complete the operating connections of the tube 103 there is a direct connection made from the cathode to the grounded lead 66 and a connection of a dropping resistor 106 between the anode and the positive lead 76.

The control grid of a triode type tube 107, serving as the cathode follower 24, is directly connected to the anode of the amplifier tube 103. Operating potentials for the tube 107 are obtained by a direct connection from the anode to the positive lead 76 and a connection from the cathode through a resistor 108 to the grounded lead 66. The previously-referenced lead 72, connected to the second and fourth grids of pentagrid tube 62, is connected to the cathode of the tube 107.

Referring now to the controlled oscillator circuit 11, in detail (see Fig. 3), there is provided a triode type tube 121 having the cathode directly connected to the grounded lead 66 and the anode connected to the positive lead 76 through two series-connected load resistors 122 and 123. A by-pass capacitor 124 is connected from the junction of the two load resistors 122 and 123 to the grounded lead 66. The anode of the triode tube is coupled to one side of a tank circuit 126 by a capacitor 127 and the control grid is coupled to the other side of the tank circuit by a capacitor 128. The control grid is also connected through a resistor 129 to the grounded lead 66. Two voltage sensitive capacitors 131 and 132 are connected in series across a coil 133 and such elements comprise the aforementioned tank circuit 126. A potentiometer 136 is directly connected between the positive lead 76 and the negative lead 67 with the adjustable element connected through a by-pass capacitor 137 to the grounded lead 66 and through a resistor 138 to a center-tap of the coil 133 in the tank circuit 126. Two series-connected resistors 141 and 142 are connected between the adjustable element of the potentiometer 136 and the junction of the two voltage-sensitive capacitors 131 and 132 in the tank circuit 126. Also, a by-pass capacitor 143 is connected from the junction of the latter two resistors 141 and 142 to the grounded lead 66. The potentiometer 136 serves as a source of variable bias for the tank circuit 126 to alter the frequency of oscillation. A pick-up coil 144 is provided adjacent the coil 133 in the tank circuit 126 with one end connected to the grounded lead 66 and the other end connected to the aforementioned lead 68 extending to the mixer 19 of both channel A and channel B. The foregoing description comprises the connections of the controlled oscillator 31, the control and operation of which will be set forth hereinafter.

A lead 151 is connected at one end to the output terminal 26 in channel A and at the other end to the control grid of a pentode type amplifier tube 152 through a current limiting resistor 153. The junction between the lead 151 and the current limiting resistor 153 is connected to the grounded lead 66 through a resistor 154. The suppressor grid of the pentode tube 152 is connected to the cathode which, in turn, is directly connected to the grounded lead 66. The screen grid of such tube 152 is directly connected to the second positive lead 87 and the anode is connected to the other positive lead 76 through a dropping resistor 156. The values of the foregoing elements and applied voltages are such that the pentode tube 152 operates at saturation current during the positive peaks of the applied signal and therefore the circuit comprises the overdriven amplifier 33.

A capacitor 157 is connected between the anode of the pentode tube 152 and the control grid of a second pentode type tube 158 as a portion of a coupling circuit 159 therebetween. The remainder of such coupling circuit 159 comprises a series-connected glow tube 161 and resistor 162 connected between the anode of the first pentode tube 152 and the negative lead 67 with a resistor 163 connected from the junction of the glow tube and resistor to the control grid of the second pentode tube 158. The suppressor grid of the pentode tube 158 is directly connected to the cathode which, in turn, is directly connected to the grounded lead 66. A voltage divider having two series-connected resistors 166 and 167 is connected between the positive lead 76 and the grounded lead 66 with the junction between the two resistors connected directly to the screen grid of the pentode tube 158 and to the grounded lead 66 through a by-pass capacitor 168. To complete the operating connections of the pentode tube 158 the anode is connected through a dropping resistor 169 to the positive lead 76. The values of such elements and voltages establish saturation current flow through the tube 158 during the positive peaks of the applied signal and thus the circuit comprises the overdriven amplifier 34.

Voltage variations at the anode of the pentode tube 158 in the second overdriven amplifier 34 are developed across a resistor 171 which is connected from the anode to the grounded lead 66. The junction of the resistor 171 and the anode of the tube 158 is connected to one side of a capacitor 172, the other side of which is connected directly to the anode of the first section 173 and the cathode of the second section 174 of a double diode type tube 176. The cathode of the first section 173 is connected to a lead 177 and through a resistor 178 to the second positive lead 87. A lead 179 is connected to the anode of the second section 174 and to the second positive lead 87 through a capacitor 181. To complete the connections of the double diode tube 176 the ends of a potentiometer 182 are connected to the second positive lead 87 and the anode of the second section 174, respectively. The two sections of the double diode tube 176 are interconnected to provide the previously-referenced cycle counter discriminator 36 and further connections of the two output leads 177 and 179 will be described hereinafter.

The adjustable element of the potentiometer 182 in the anode circuit of the second section 174 of the double diode tube 176 is connected through a resistor 186 to the control grid of a pentode type tube 187, which serves as the principal element of the control amplifier 37. Bias for the control grid of such tube 187 is provided by a resistor 188 connected from the control grid to the adjustable element of a potentiometer 189 which, in turn, is connected between the two positive leads 76 and 87. Also, a resistor 191 and a capacitor 192 are connected in series between the control grid of the tube 187 and the second positive lead 87. The suppressor grid of the tube 187 is directly connected to the cathode which, in turn, is connected to the second positive lead 87 and the screen grid is directly connected to the first positive lead 76 for the purpose of impressing required operating potentials. Likewise, the anode of the tube 187 is connected through a dropping resistor 193 to the first positive lead 76. To connect the output of the control amplifier 37 to the controlled oscillator 31, a lead 194 is connected from the anode of the tube 187 of the former to the junction of the two resistors 141 and 142 of the latter.

The internal synch starter 38 comprises a triode type tube 201, as the principal element, and the control grid thereof is connected through a coupling capacitor 202 to the lead 179 originating at the anode of the second section 174 of the tube 176 in the cycle counter discriminator 36. Operating connections of the tube 201 are provided by a resistor 203 connected from the control grid to the grounded lead 66, a direct connection from the cathode to the grounded lead 66, a dropping resistor 204 connected from the anode to the first positive lead 76, and a by-pass capacitor 206 connected in parallel with such dropping resistor.

A coupling capacitor 207 is connected from the anode of the tube 201, which serves as the output of the internal synch starter 38, to the second position 39 of the switch 41. The first position 208 of such switch 41 is not connected and so serves as an "off" position. As previously set forth the third position 42 is connected to the terminal 43 which may be connected to a source of external synchronizing signals (not shown).

The swinger 44 of the switch 41 is connected to the input of the gate time multivibrator (MV) 46 having two triode type tubes 211 and 212 as the principal elements thereof. In detail the swinger 44 is connected through a resistor 213 to the grounded lead 66 and through a coupling (crystal) rectifier 214 to the control grid of the first triode tube 211. Bias is supplied to the control grid of such tube 211 by connecting a resistor 216 between the control grid and the negative lead 67. Other operating connections of the first tube 211 include a direct connection from the cathode to the grounded lead 66 and the connection of a dropping resistor 217 between the anode and the first positive lead 76. One side of a storage capacitor 218 is connected to the anode of the first tube 211 and the other side of such capacitor is connected to the control grid of the second tube 212 with the control grid connected through a resistor 219 to the adjustable element of a potentiometer 221 having one side connected to the grounded lead 66. Operating connections of the second tube 212 are accomplished by a direct connection from the cathode to the grounded lead 66 and by connection of a resistor 222 between the anode and the first positive lead 76. Feedback is accomplished by connecting a parallel circuit, comprising a resistor 223 and a capacitor 224, between the anode of the second tube 212 and the control grid of the first tube 211. Two series-connected resistors 226 and 227 are connected between the anode of the second tube 212 and the negative lead 67 with the junction between such resistors serving as the output of the gate time multivibrator 46.

The gate width multivibrator (MV) 47 comprises two triode type tubes 231 and 232 which are the principal elements thereof. The junction of the two resistors 226 and 227 in the gate time multivibrator 46 is connected by a parallel circuit, including a resistor 233 and a capacitor 234, to the anode of the first tube 231. Other connections of such tube 231 comprise a resistor 236 connected between the anode and the first positive lead 76, a direct connection from the cathode to the grounded lead 66, and a resistor 237 connected between the control grid and the negative lead 67. A capacitor 238 is connected between the anode of the first tube 231 and the control grid of the second tube 232. Operating connections of such second tube 232 comprise a resistor 239 connected from the control grid to the adjustable element of a potentiometer 241, one side of the latter being connected to the grounded lead 66, a direct connection from the cathode to the grounded lead 66, and a resistor 242 connected between the anode and the first positive lead 76. Feedback is accomplished by the connection of a parallel circuit, comprising a resistor 243 and a capacitor 244, between the anode of the second tube 232 and the control grid of the first tube 231. The foregoing connections are such that the input and output of the gate width multivibrator 47 are the same and will be discussed more fully hereinafter.

Figure 3:
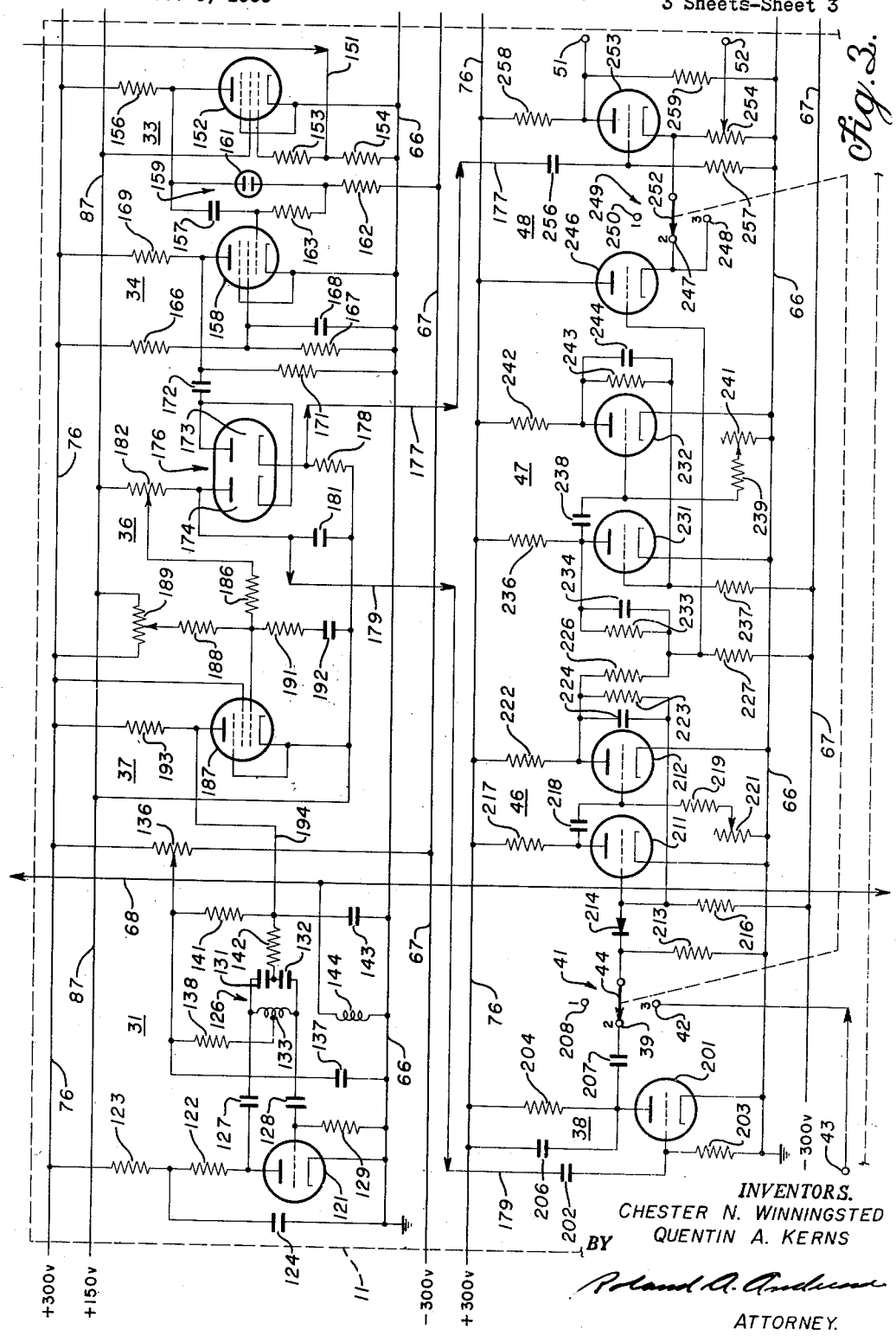
Figure 3 is a schematic wiring diagram of the oscillator and control circuit therefor of Fig. 1.

The junction of the two resistors 226 and 227 in the gate time multivibrator 46 is also directly connected to the control grid of a first triode type tube 246 in the gate circuit 48. The anode of such tube 246 is directly connected to the first positive lead 76 and the cathode is directly connected to the second and third positions 247 and 248 of a three-position switch 249. The first position 250 of such switch 249 is disconnected and so provides an "off" position. Preferably the two switches 41 and 249 are gang operated as illustrated in Fig. 3. The swinger 252 of the switch 249 is directly connected to the cathode of a second triode type tube 253. The cathode of such second tube 253 is connected to the grounded lead 66 through a potentiometer 254, the adjustable element of which is connected to the terminal 52. A capacitor 256 is connected between the lead 177, originating at the cycle counter discriminator 36, and the control grid of the second tube 253, the control grid being further connected to the grounded lead 66 through a resistor 257. Other operating connections of the second tube 253 include a resistor 258 connected from the anode to the first positive lead 76 and a resistor 259 connected from the anode to the grounded lead 66. Also, a connection is made from the anode of the second tube 253 to the terminal 51.

Consider now the operation of the present invention, assembled as set forth in the foregoing, with suitable potentials applied and with the switches 41 and 249 in the second position. The input terminals 16 of channels A and B are then, respectively, connected to points of an R. F. (radio frequency) system between which it is desired to determine the phase difference. Preferably the frequency of the controlled oscillator 31 is established at a value less than the frequency of the R. F. system (in the present instance, for the purpose of illustration, the controlled oscillator has a frequency 20 kilocycles below that of the R. F. system). The components of the controlled oscillator 31 are such that the oscillator is free-running and operation is continuous. Initially, the frequency of the controlled oscillator 31 may be established at a desired value with respect to the R. F. system by utilization of a suitable coil 133 in the tank circuit 126 and by adjustment of the potentiometer 136 to establish suitable bias for the voltage-sensitive capacitors 131 and 132 in the tank circuit.

Under the foregoing conditions there is a signal voltage having a first frequency impressed at the third grid of the mixer tube 62 and a second voltage having a second frequency impressed at the first grid. Voltage variations at the anode of the mixer tube 62 will then contain sum and difference frequencies as well as components of both impressed frequencies. Such voltage variations are coupled to the cathode follower tube 86. To prevent voltages containing other than the difference frequencies from reaching the control grid of the latter tube 86, the load or dropping resistor 74 of the mixer tube 62 is selected to have a substantially large value which results, in combination with circuit stray capacitances, in a low pass filtering action. The cathode follower tube 86 is therefore driven with a voltage having the difference frequency, in the present instance 20 kilocycles. Since the output terminal 26 is connected directly to the cathode of the cathode follower tube 86, the voltage having the difference frequency appears at the output terminal 26. It is to be noted that the coupling between the mixer tube 62 and the cathode follower tube 86 provides direct current coupling so that the output voltage at the terminal 26 substantially retains the phase of the voltage at the input terminal 16.

Direct current coupling is employed to impress a portion of the voltage at the output terminal 26 upon the control grid of the regulator tube 92. The amplifier tube 103 follows the regulator tube 92 and drives the cathode follower tube 107. In each instance the tubes are direct current coupled and the cathode of the cathode follower tube 107 is directly connected to the second and fourth grids of the mixer tube 62 to establish the direct current level at the output terminal 26 and to maintain such level constant.

As stated previously, both channels A and B are similar so that a signal voltage at the difference frequency appears at the output terminals 26. The direct current level at each of the output terminals 26 is separately adjustable to the same value at the potentiometer 94 and the regulator action of the circuit is such as to maintain the level constant.

The voltage output at terminal 26 of channel A is also connected to two series-connected overdriven amplifiers 33 and 34 which develop a square wave from the voltage impressed. Such square wave is coupled to the anode of the first diode section 173 and to the cathode of the second diode section 174 of the tube 176 in the cycle counter discriminator 36. At the cathode of the first diode section 173 there is developed a series of positive square waves of voltage, one for each cycle of the output of the second overdriven amplifier 34, which is available at the lead 177 and which will be discussed more fully hereinafter. Also, at the anode of the second section 174 there is developed a similar series of negative voltages which is available at the lead 179 and which will be discussed more fully hereinafter. A portion of the anode voltage of the second section 174 is taken from the adjustable element of the potentiometer 182, compared with reference voltage taken from the adjustable element of the potentiometer 189, and the difference is applied to the control grid of the control amplifier tube 187. The resulting voltage variations at the anode of the control amplifier tube 187 are then utilized to control the bias applied to the voltage-sensitive capacitors 131 and 132 in the tank circuit of the controlled oscillator 31. The foregoing connections provide an increasingly positive voltage at the capacitors 131 and 132 when the difference frequency at the output terminal 26 increases. An increasing voltage at the capacitors 131 and 132 results in an increase in the frequency of the controlled oscillator 31 and therefore a decrease in the difference frequency. In such manner, then, the difference frequency is maintained at a constant value which in the presently illustrated circuit is 20 kilocycles.

It is to be noted that adjustment of the potentiometer 136 in the controlled oscillator 31 provides alteration of the frequency of the oscillator and that, after the position of the potentiometer has been set, an adjustment of the potentiometer 189 in the cycle counter discriminator 36 provides alteration of the difference frequency. It is also to be noted that the sensitivity of the frequency control circuit may be varied by adjustment of the potentiometer 182 in the anode circuit of the second diode section 174 in the cycle counter discriminator 36.

To facilitate synchronization of the oscilloscope 13, the lead 179 from the cycle counter discriminator 36 as connected to the second diode section 174 is connected to the control grid of the tube 201 in the internal synch starter 38. The capacitor 202 and resistor 203 in the control grid circuit of such tube 201 provides a differentiator circuit to impress a negative pulse at the start of each negative half of the cycle of the difference frequency voltage. The negative pulses at the control grid of the normally conducting tube 201 provide a positive signal at the anode which is coupled through the capacitor 207, switch 41, and trigger-coupling rectifier 214 to the gate time multivibrator 46. The purpose of the trigger-coupling rectifier 214 is to permit only positive pulses to reach the gate time multivibrator 46. Each positive pulse results in a transfer of conduction between the two tubes 211 and 212 thereof so that a positive voltage is developed at the anode of the second tube 212. The duration of the developed positive voltage is determined by the setting of the potentiometer 221 in the circuit including the capacitor 218.

Now it will be seen that the anode of the second tube 212 in the gate time multivibrator is coupled to the anode of the first tube 231 and to the control grid of the second tube 232, both in the gate width multivibrator 47. For the duration of the positive voltage developed at the anode of tube 212, there is no effect upon the operation of tubes 231 and 232 because first tube 231 is nonconductive and second tube 232 is conductive. However, at the termination of the aforementioned, developed positive voltage a negative signal is transmitted to the control grid of the second tube 232 to cut off the tube and render the first tube 231 conductive. The result of such action is to develop a negative voltage at the junction between resistors 226 and 227 which follows the developed positive voltage. The duration of such developed negative voltage is determined by the setting of the potentiometer 241 in the control grid circuit of the second tube 232.

The junction between the two resistors 226 and 227 in the gate time multivibrator is directly connected to the control grid of the first tube 246 in the gate circuit 48. The connections of such tube 246 render the tube normally conductive so that no change in operation occurs during the positive portion of the impressed voltage at the control grid. During, however, the negative portion of the voltage impressed at the control grid of the tube 246, the tube is nonconductive and current flow through the cathode potentiometer 254 is reduced to a minimum. Such action results in lowering the cathode voltage of the second tube 253 to the point where operation of the tube depends upon the voltage impressed on the control grid. It will be noted that the lead 177, originating at the cathode of the first diode section 173 in the cycle counter discriminator 36, is connected to the control grid of the second tube 253 by a capacitor 256 and resistor 257 combination which provide a differentiator action. Thus the tube 253 passes a series of negative pulses during the time of the negative gate voltage at the cathode. Such pulses are then available at the terminal 51 as a source of synchronizing pulses. The terminal 52 is connected to the adjustable element of the cathode potentiometer 254 and provides a source of brightener pulses.

With the terminals 26 of channels A and B and terminals 51 and 52 suitably connected to the dual beam oscilloscope 13, the phase relationship between the input signals of channels A and B will be indicated by the respective position of the traces on the screen of the oscilloscope (illustrated in Fig. 1). The screen of the oscilloscope may be readily calibrated so that the phase difference is directly readable in electrical degrees.

When it is desired to utilize the synchronizing and brightener circuits of the oscilloscope 13, the switches 41 and 249 are placed in the first or "off" position so that the terminals 51 and 52 will not affect operation of the oscilloscope. Should external synchronization of the oscilloscope be desired, a suitable pulse generator (not shown) may be connected to the terminal 43 and the switches 41 and 249 placed in the third position. In the latter situation the internal synch starter 38 is disconnected from the gate time multivibrator 46 and the remainder of the gate forming circuit operates in the manner previously described in response to the output of the pulse generator.

It is to be noted that the present invention is useful to determine phase difference where the radio frequency system is pulsed as well as continuous wave. However, if pulsed, it has been found that the circuit elements limit successful operation to pulses having a duration of at least five milliseconds. Such limitation is not serious with respect to the utility of the invention in present applications. Also, single beam oscilloscopes may be utilized by applying the outputs of channels A and B singly and noting the positions of the respective traces.

While the salient features of the present invention have been described in detail with respect to one embodiment it will be apparent that numerous modifications may be made within the spirit and scope of the invention, and it is therefore not desired to limit the invention to the exact details shown except insofar as they amy be defined in the following claims.

What is claimed is:

1. In a radio-frequency phase meter having an oscillator with biased voltage-sensitive capacitors in a frequency-determining tank circuit and means developing a voltage at a frequency equal to the difference frequency between an input voltage and the voltage of said oscillator, the combination comprising amplifier means developing a square wave voltage in response to said voltage of difference frequency, means connected to said amplifier means developing a voltage having a magnitude proportional to said difference frequency, voltage means having a valve of voltage proportional to the bias of said capacitors connected to said last-named means to provide a difference voltage, and means connected between said voltage means and said capacitors to alter the bias in response to said difference voltage and maintain the voltage of difference frequency at a substantially constant frequency.

2. In a radio-frequency phase meter having an oscillator with biased voltage-sensitive capacitors in a frequency-determining tank circuit and means developing a voltage at a frequency equal to the difference frequency between an input voltage and the voltage of said oscillator, the combination comprising amplifier means developing a square wave voltage in response to said voltage of difference frequency, diode means having the cathode coupled to said amplifier means to provide a voltage having a magnitude proportional to said difference frequency, voltage means connected to the anode of said diode means and having a value of voltage proportional to the bias of said capacitors to provide a difference voltage, and means connected between said voltage means and said capacitors to alter the bias in response to said difference voltage and maintain the voltage of difference frequency at a substantially constant frequency.

References Cited in the file of this patent

UNITED STATES PATENTS

| | | |
|---|---|---|
| 2,490,899 | Cohen | Dec. 13, 1949 |
| 2,546,407 | Rich | Mar. 27, 1951 |
| 2,580,803 | Logan | Jan. 1, 1952 |